United States Patent
Sikes

[11] 3,767,094
[45] Oct. 23, 1973

[54] GUN HOLDER

[76] Inventor: Robert L. F. Sikes, Route 1, Crestview, Fla. 32536

[22] Filed: Feb. 25, 1972

[21] Appl. No.: 230,164

[52] U.S. Cl............ 224/1 R, 224/42.42 A, 108/44, 248/346
[51] Int. Cl. .......................................... F41c 33/00
[58] Field of Search.................. 224/42.42 A, 29 D, 224/1 R, 29 R; 108/44; 211/64; 248/346; 297/191; 312/235 A

[56] References Cited
UNITED STATES PATENTS

| | | | |
|---|---|---|---|
| 2,692,069 | 10/1954 | Winters et al. ................. | 224/290 X |
| 2,775,351 | 12/1956 | Johnson et al. ............... | 224/290 UX |
| 2,806,131 | 9/1957 | Palmer............................ | 248/346 X |
| 3,632,158 | 1/1972 | Boothe............................ | 108/44 X |

Primary Examiner—Gerald M. Forlenza
Assistant Examiner—Jerold M. Forsberg
Attorney—Michael W. York et al.

[57] ABSTRACT

A gun holding apparatus for holding guns on a vehicle seat including a gun holder device having a base and a support member extending upwardly from the upper forward portion of the base. The lower portion of the base has a flexible container for holding lead shot or similar weighting material for assisting in holding the gun holding device on the vehicle seat. Two U-shaped notches are provided in the upper forward end of the support member for holding portions of guns that have other portions resting on or near the floor of the vehicle. A slip resistant coating covers the underside of the flexible container and assists in preventing the gun holding device from sliding on the vehicle seat. A second gun holding device is also provided which is located on the floor of the vehicle and has hook members for holding the portions of the guns which are on or near the vehicle floor.

8 Claims, 6 Drawing Figures

PATENTED OCT 23 1973

GUN HOLDER

BACKGROUND OF THE INVENTION

Frequently, rifles, carbines and shotguns must be carried in vehicles such as automobiles and the like. Police frequently must carry such firearms in the passenger compartment of their automobiles and hunters sometimes also carry such firearms in the vehicle in which they are riding. When firearms are carried in vehicles, it is important that the firearms be secured within the vehicle in a manner that prevents them from being thrown about within the vehicle and being subject to damage or possibly causing injury to the occupants of the vehicle. Therefore, it is important that such firearms be adequately secured within the vehicle, but at the same time it is important that such firearms be readily available for use. This is particularly important with respect to firearms that are carried within police or military vehicles where lives may depend upon the speed in which the firearm can be brought into use.

Firearms should also be secured within the vehicle in such a manner that the firearms do not interfere with the movement of occupants within the vehicle or interfere with the vehicle occupants as they enter or leave the vehicle. This is particularly important with regard to military or police vehicles where it may be necessary for the firearms to be readily accessible within the vehicle for extended periods of time and where the vehicle occupants may be in and out of the vehicle many times in the course of their duties.

There are a number of devices that have been previously disclosed for holding or mounting guns or firearms within vehicles. U.S. Pat. No. 3,477,587 discloses a gun rack that is designed to be mounted on the underside of an automobile trunk lid. This type of gun rack does not interfere with the occupants of the vehicle. However, this type of trunk mounted gun rack would not be acceptable for military or police use where it is necessary that the firearms that are held by the rack be readily accessible within the passenger compartment of the vehicle. U.S. Pats. 2,535,564; 2,797,033; and 3,167,182 all disclose gun racks that are mounted on the front vehicle seat and support the firearms immediately behind the front vehicle seat. The firearm racks described in these patents also have the advantage of not interfering with the freedom of movement of the occupants of the front seat. However, these firearm racks have a disadvantage in that the occupants of the front seat must either reach over the front seat or get out of the vehicle and open the door of the vehicle to obtain the firearms from the rack. Therefore, they do not hold firearms in a manner that permits them to be available for immediate use and thus these racks are not well suited for use by law enforcement officials. In addition, these types of racks that mount the firearms behind the front seat are generally not usable in cars that only have two doors, since the firearms will interfere with the movement of the backs of the front seats in a forward direction to permit access to the rear vehicle seats. Racks that mount the firearms on the front seat backs may also hold firearms in such a manner that they interfere with the rear seat occupants' leg room.

A number of other vehicle gun racks have been proposed that attempt to solve the problems of storing guns or firearms within the vehicle so that they do not interfere with the movement of the occupants within the vehicle. U.S. Pat. No. 2,823,808 discloses a rifle rack that can be mounted on the rear wall of the vehicle. However, not all vehicles have a rear wall that can accept such a rack and the firearms that are held by such a rack are not readily accessible to occupants of the front seat. U.S. Pat. No. 2,929,539 discloses a rack for firearms that can be mounted above the windshield and the sun visors of a vehicle. Unfortunately, many vehicles do not have sufficient room above the windshield to accommodate such a gun rack without interfering with the vision and safety of the vehicle occupants. U.S. Pat. No. 2,998,885 describes a gun rack that can be mounted to the underside of the top of the vehicle so that the firearms would be held above the occupants' heads. Such gun racks may not be usable in many modern automobiles that have comparatively little head room since the heads of the occupants could strike the firearms that are held by such racks and they might interfere with the rapid removal of the firearms from the rack. A gun mount that is located near the door of a vehicle is illustrated in U.S. Pat. No. 2,919,058, but such a gun mount and a firearm held by such a mount might interfere with the ability of an occupant to easily enter and exit from the vehicle. Another type of gun rack is disclosed in U.S. Pat. 3,556,363 that is adapted to be located on a vehicle door to hold a firearm against the inside of the door. Many doors in modern automobiles are insufficiently large to accommodate many long barreled firearms and thus this type of gun rack cannot be used in many automobiles. In addition, a firearm that is secured to the inside of the vehicle door may interfere with the occupants' ability to easily operate the door handles and the handle that raises and lowers the window in the door.

U.S. Pats. Nos. 2,692,069 and 2,750,088 disclose gun racks or holders that are capable of being mounted on the seat of a vehicle such as an automobile and these gun racks have the advantage of being capable of mounting firearms such as shotguns or rifles on or near the seat of the vehicle where they are readily accessible to the occupants of the front seat. However, such gun racks are secured to the seats or associated vehicle structures by hooks, screws or the like and thus the gun racks may have to be adjusted or adapted to the particular type of seat that is used within the vehicle and this limits their utility and increases their cost. U.S. Pats. 2,775,351 and 3,477,586 also disclose gun holders that are capable of being mounted on the seat of a vehicle and they do not need to be secured to the vehicle seat by hooks, screws or the like. However, these gun racks may lack stability and may slide about on the seat. In addition, the gun rack disclosed in U.S. Pat. 3,477,586 extends from the floor of the vehicle to the back of the vehicle seat and this occupies a considerable amount of room within the vehicle and may interfere with the vehicle occupants.

The present invention overcomes the disadvantages associated with other prior vehicle gun racks and the like and provides a vehicle gun holding apparatus with a device for use on a vehicle seat that does not have to be secured to the seat by clamps, screws or the like and yet has good stability. The present gun holding apparatus also holds guns or firearms such as shotguns and rifles within a vehicle such as an automobile so that they are readily accessible to the occupants of the vehicle and yet they are held in such a manner that they do not interfere with the vehicle occupants' freedom of movement.

BRIEF DESCRIPTION OF THE INVENTION

This invention relates to vehicle gun holding or supporting devices and apparatus for holding or supporting guns within a vehicle and more particularly to vehicle gun holding or supporting devices adapted to be used on vehicle seats.

It is an object of the present invention to provide a vehicle gun holding apparatus having a device adapted to be used on a vehicle seat.

It is an object of the present invention to provide a vehicle gun holding apparatus which has a device for holding a portion of a gun on a vehicle seat that has another portion resting on or near the floor of the vehicle.

It is an object of the present invention to provide a vehicle gun holding apparatus which has a gun holding device that is suitable for use on various types of vehicle seats.

It is a further object of the present invention to provide a vehicle gun holding apparatus which has a vehicle seat device that does not have to be secured to the vehicle seat by fasteners and the like.

It is also an object of the present invention to provide a vehicle gun holding apparatus which has a gun holding device for use on a vehicle seat that resists movement.

It is also an object of the present invention to provide a vehicle holding apparatus which has a gun holding device for use on a vehicle seat having weight means for assisting in holding the gun holding device on the vehicle seat.

The present invention provides a gun holding apparatus for holding guns on a vehicle seat which includes a first gun holding device which is locatable on the vehicle seat. The first gun holding device has a base, a projection extending upward from one end of the base which has at least one notch in its upper end which is shaped to hold one end portion of a gun, a flexible container located on the underside of the base, and weight means located in the flexible container for permitting the underside of the flexible container to conform to the general shape of the upper surface of the vehicle seat and for assisting in holding the first gun holding device on the vehicle seat. A second gun holding device is also provided which is unconnected to the first gun holding device and is located forwardly of the vehicle seat and the second gun holding device has a hook member for receiving the other end portion of the gun.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figure 1:
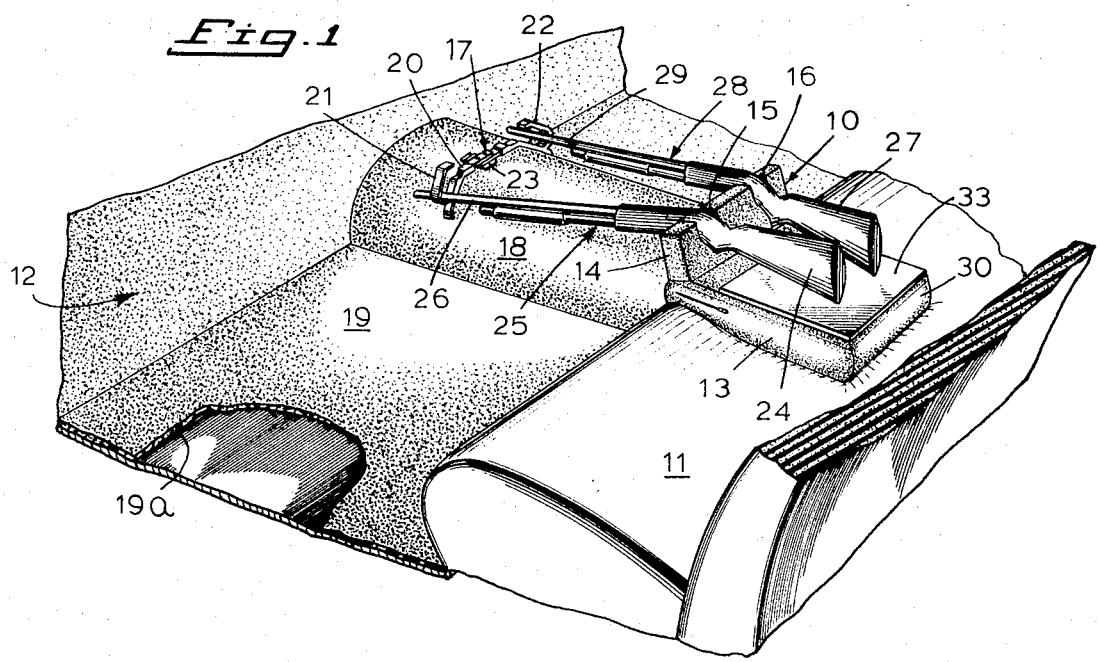
FIG. 1 is a perspective view of a portion of the passenger compartment of a vehicle such as an automobile illustrating the gun holding apparatus of the present invention including a vehicle seat gun holding device in use holding guns within the vehicle passenger compartment.
Figure 2:
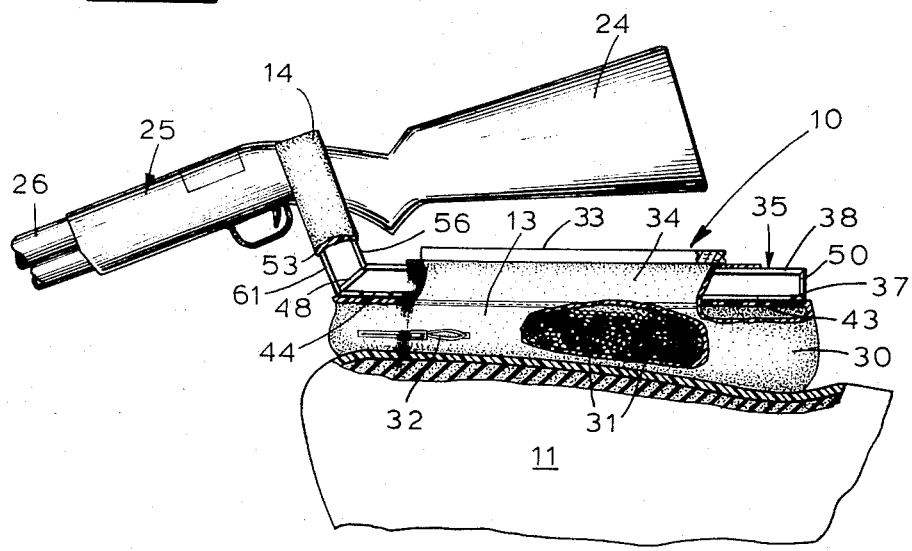
FIG. 2 is a side elevational view, partly broken away, of the vehicle seat gun holding device illustrated in FIG. 1.

Referring first to FIGS. 1 and 2 the vehicle seat gun holding device of the gun holding apparatus of the present invention is generally designated by the number 10 and is illustrated in use on a vehicle passenger seat 11 located within the passenger compartment 12 of a vehicle such as an automobile or the like. The vehicle seat gun holding device 10 comprises a generally rectangular shaped base 13 that is adapted to rest upon the upper surface of the vehicle seat 11 and a generally rectangular shaped projection or support member 14 that extends upwardly at an angle from the upper forward portion of the base 13. The support member 14 has two U-shaped notches 15 and 16 located in its upper forward end that are shaped and sized to receive a portion of a gun, such as the handgrip of the stock, that has another portion resting on or near the floor of the vehicle. As illustrated in FIG. 1, the vehicle seat gun holding device 10 is utilized in conjunction with a floor mounted device or gun holder 17 that is described in my co-pending U.S. Pat. application Ser. No. 192,359 for a gun holding device which was filed on Oct. 26, 1971 now issued as U.S. Pat. No. 3,706,403. The floor mounted gun holder 17 is mounted on the curved driveshaft portion 18 of the vehicle floor 19.

Briefly, the floor mounted gun holder 17 comprises a base 20 generally shaped to fit crosswise on the longitudinally extending raised portion 18 of the floor 19 that covers the vehicle's driveshaft. A hook member 21 projects from the portion of the base 20 that is shaped to fit on one side of the raised portion 18 of the floor 19 and a similar hook member 22 projects from the portion of the base 20 that is shaped to fit on the opposite side of the raised floor portion 18. The base 20 of the floor mounted gun holder 17 may be attached to the pierceable covering 19a that forms part of the vehicle floor 19 by means of a clip 23 that is connected to the underside of the base 20 that has prongs (not shown) for piercing the floor covering or the base 20 may be attached to the raised portion 18 of the floor 19 by some other well known means such as bolts and the like. The U-shaped notch 15 is adapted to receive and hold a portion of the pistol or hand-grip portion of the stock 24 of a firearm such as a shotgun 25 that has the forward portion of its barrel 26 resting in the hook member 21. In a similar manner, the U-shaped notch 16 is adapted to receive and hold a portion of the pistol or hand-grip portion of the stock 27 of a second firearm such as a shotgun 28 that has the forward portion of its barrel 29 resting in the hook member 22. It should also be appreciated that the vehicle seat gun holding device 10 can be used without a floor mounted gun holder 17 or the like and in such cases the forward portions of the barrels 26 and 29 of the respective shotguns 25 and 28 would rest on the floor 19 on each side of the raised floor portion 18.

As best illustrated in FIG. 2, the base 13 of the vehicle seat gun holding device 10 has weight means for assisting in holding the gun holding device on the vehicle seat 11 comprising a flexible container or bag 30 located on its underside that holds lead shot 31. It will, of course, be appreciated that steel shot or the like could also be used, but lead shot is preferred because of its greater weight for a given volume and hence its greater ability to create frictional forces between the underside of the container 30 and the upper surface of the seat 11. A zippered opening 32 is provided in the wall of the container 30 in order to permit the lead shot 31 to be added or removed from the container. It should be noted that the use of the shot 31 inside of the container 30 permits the underside of the container to be distorted by the upper surface of the seat 11 and this permits the vehicle seat gun holding device 10 to be used on a wide variety of seats that have different contours. Furthermore, the deformation of the underside of the container 30 is desirable since it assures good contact with the upper surface of the seat and thus assists in holding the vehicle seat gun holding device 10 in place. This deformation is made possible by the fact that the shot 31 comprises spheres that roll against each other and tend to flow to conform to the upper surface of the seat. It should also be noted that the weight of the shot 31 causes the container 30 to depress the upper surface of the seat 11 slightly and this assists in preventing the vehicle seat gun holding device 10 from moving on the seat.

Figure 3:
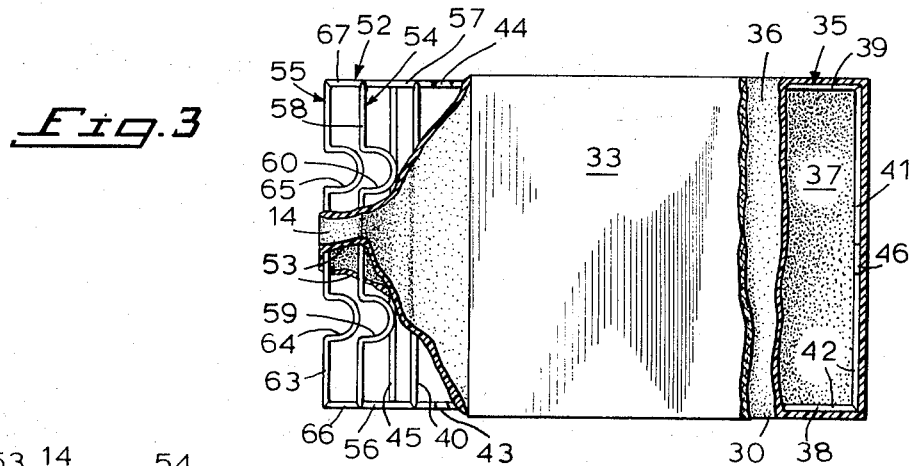
FIG. 3 is a plan view, partly broken away, of the vehicle seat gun holding device illustrated in FIG. 2.
Figure 4:
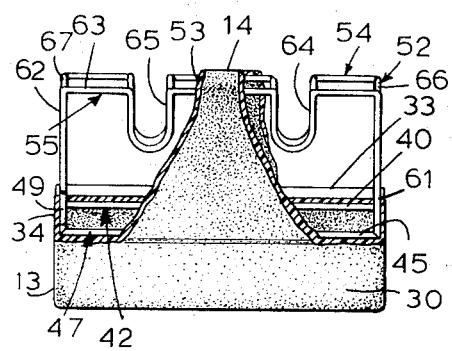
FIG. 4 is a front elevational view, partly broken away, of the vehicle seat gun holding device illustrated in FIG. 3.
Figure 5:
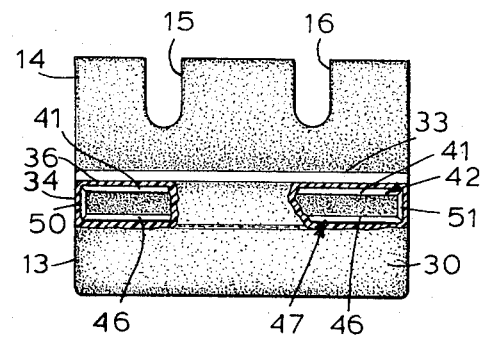
FIG. 5 is a rear elevational view, partly broken away, of the vehicle seat gun holding device illustrated in FIG. 3.

As best illustrated in FIGS. 1 through 3, a flat rectangular shaped piece of fiberboard 33 is connected by a suitable epoxy glue to the upperside of the base 13. This piece of fiberboard 33 can be used by the vehicle occupants as a writing surface when the vehicle seat gun holder 10 is not being used to hold firearms such as the shotguns 25 and 28 and this increases the usefulness of the vehicle seat gun holding device.

The details of the interior construction of the vehicle seat gun holding device 10 are illustrated in FIGS. 2 through 5. The upper portion 34 of the generally rectangular shaped base 13 comprises a generally rectangular shaped wire frame 35 that is almost totally covered by a flexible covering 36, which may be the same type of material used for the container 30, that is stretched tight on the frame. It should be noted that the bottom portion 37 of the covering 36 for the wire frame 35 also serves to close or seal the top of the container 30. The upper portion of the frame 35 is formed from two long parallel wire rods 38 and 39 and two shorter parallel wire rods 40 and 41 that are welded together at their appropriate ends to form a rectangular shaped upper framework 42. The lower portion of the frame 35 is also formed from two parallel wire rods 43 and 44 that are slightly longer than the rods 38 and 39 and two shorter wire rods 45 and 46 that are approximately the same length as the rods 40 and 41. The rods 43, 44, 45 and 46 are welded together at their appropriate ends to form a rectangular shaped framework 47 that is slightly longer than the upper framework 42 but has substantially the same width. The adjacent corners of the upper and lower frameworks 42 and 47 are connected by short wire rods 48, 49, 50 and 51 whose ends are welded to appropriate corners of the upper and lower frameworks.

The support member 14 also has a wire frame 52 which is almost totally covered by a flexible covering 53 that is stretched tight on the frame which should be the same type of material that is used to cover the frame 35 of the base 13. The support member frame 52 comprises respective similar inner and outer frameworks 54 and 55. The inner framework 54 has two parallel wire rod legs 56 and 57, which are connected by welding at their upper ends to a wire rod crossbar 58 which has two U-shaped bent portions 59 and 60. In a similar manner, the outer framework 55 has two parallel wire rod legs 61 and 62 which are connected by welding at their upper ends to a wire rod crossbar 63 which has two U-shaped bent portions 64 and 65 which are similar to the U-shaped bent portions 59 and 60 of the crossbar 58. The upper corners of the inner and outer frameworks 54 and 55 are connected by short wire rods 66 and 67 whose ends are welded to the appropriate upper corners of the inner and outer frameworks and the lower ends of the legs 56, 57, 61 and 62 are welded to the ends of the short wire rods 48 and 49 so that the support member 14 extends upward and forward from the base 13 at an angle. Since the support member 14 extends forward at an angle this permits the U-shaped notices 15 and 16 to readily hold a portion of a gun that has another portion resting on or near the floor 19 of the vehicle when the vehicle seat gun holder is resting on the vehicle seat 11.

Figure 6:
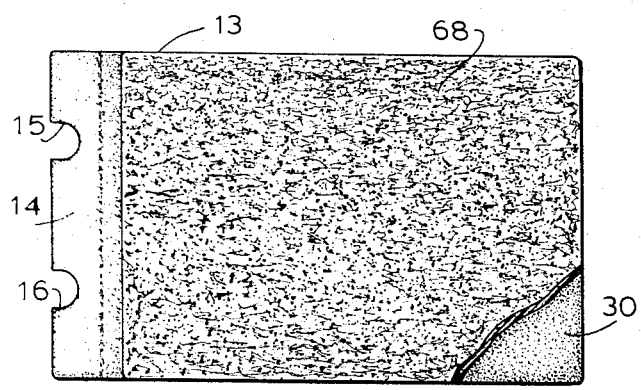
FIG. 6 is a bottom view of the vehicle seat gun holding device illustrated in FIG. 3.

As illustrated in FIG. 6, the bottom of the flexible container 30 is covered with a slip resistant covering or coating 68 which may comprise a thermoplastic or rubber material impregnated with various types of granules that provide a material that has a rough outer surface. Alternatively, the thermoplastic or rubber material may have its underside impressed with a waffle iron like pattern which tends to prevent slipping. This slip resistant coating also assists in preventing the vehicle seat gun holding device 10 from shifting or moving when it has been placed on the vehicle seat 11. It will be appreciated that a slip resistant covering or coating may be omitted if the gun holding device is not to be subjected to severe sideward forces.

The flexible container 30 and the flexible coverings 36 and 52 may be made from sheets of synthetic or natural leather or other materials which are known to those skilled in the art. For clarity, the stitching which connects the coverings 36 and 52 together and which connects the flexible container 30 to the coverings has been omitted in the drawings since the techniques for stitching such materials are well known to those skilled in the art.

It is contemplated that the vehicle seat gun holding device 10 will normally be stored and shipped without any shot in the container 30 in order to reduce storage and shipping costs since lead shot is readily available locally. In this connection, it should be noted that the covered frame construction of the vehicle seat gun holding device 10 results in a very light weight device when the shot 31 is removed from the container 30. In order to utilize the vehicle seat gun holding device, shot 31 must be introduced into the container 30 through the zippered opening 32 in the container wall. Generally, any size of bird or buck shot that is available locally from sporting good suppliers and the like may be utilized satisfactorily. The amount of shot to be used will depend to some extent on the weight of the guns that the vehicle seat gun holding device 10 is to hold. If heavy guns are to be held, more shot should be added to the container 30 than for light guns.

After the shot 31 has been added to the container 30, the vehicle seat gun holding device 10 is placed in the center of the vehicle seat 11 with its support member 14 located near the forward edge of the seat. If a floor mounted gun holder 17 is also to be used it should be attached to the raised portion 18 of the floor 19 in front of the vehicle seat 11. One or two firearms such as the shotguns 25 and 28 may have the pistol grip portions of their stocks 24 and 27 placed in the respective U-shaped notches 15 and 16 and the respective forward portions of the barrels 26 and 29 may be placed on the vehicle floor 19 in front of the seat 11 or if the floor mounted holder 17 is being utilized the forward portions of the respective barrels 26 and 29 may be placed in the respective hook members 21 and 22. Either one of the shotguns 25 and 28 or both of the shotguns can be rapidly removed from the vehicle seat gun holding device 10 and from the hook members 21 and 22 if the floor mounted gun holder 17 is utilized when they are needed.

As used herein the term gun is meant to include a shotgun, rifle, carbine, machinegun, submachinegun and the like.

Although the invention has been described in considerable detail with reference to a preferred embodiment, it will be understood and appreciated that variations and modifications may be made within the spirit and scope of the invention as defined in the appended claims.

What is claimed is:

1. A gun holding apparatus for holding guns on a vehicle seat comprising: a first gun holding device locatable on the vehicle seat; said first gun holding device comprising a base, a projection extending upward from one end of said base and having at least one notch in the upper end thereof shaped to hold one end portion of a gun, a flexible container located on the underside of said base, and weight means located in said flexible container for permitting the underside of said flexible container to conform to the general shape of the upper surface of the vehicle seat and for assisting in holding said first gun holding device on the vehicle seat; and a second gun holding device unconnected to said first gun holding device located forwardly of the vehicle seat and having a hook member for receiving the other end portion of the gun.

2. The vehicle seat gun holding apparatus of claim 1 wherein said base and said projection comprise a wire frame covered by a plastic material.

3. The vehicle seat gun holding apparatus of claim 1 further comprising a slip resistant coating covering at least a portion of the underside of said flexible container.

4. The vehicle seat gun holding apparatus of claim 1 wherein said weight means tends to be flowable to conform to the upper surface of the vehicle seat.

5. The vehicle seat gun holding apparatus of claim 4 wherein said weight means comprises shot.

6. The vehicle seat gun holding apparatus of claim 5 wherein said shot contains lead.

7. The vehicle seat gun holding apparatus of claim 5 wherein said flexible container has an opening for permitting the removal of said shot from said container.

8. The vehicle seat gun holding apparatus of claim 7 further comprising a zipper connected to said flexible container for opening and closing the opening of said flexible container.

* * * * *